United States Patent
Ben-David et al.

(10) Patent No.: US 9,535,450 B2
(45) Date of Patent: Jan. 3, 2017

(54) SYNCHRONIZATION OF DATA STREAMS WITH ASSOCIATED METADATA STREAMS USING SMALLEST SUM OF ABSOLUTE DIFFERENCES BETWEEN TIME INDICES OF DATA EVENTS AND METADATA EVENTS

(75) Inventors: Shay Ben-David, Haifa (IL); Evgeny Hazanovich, Haifa (IL); Zak Mandel, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 1160 days.

(21) Appl. No.: 13/184,542

(22) Filed: Jul. 17, 2011

(65) Prior Publication Data

US 2013/0019121 A1    Jan. 17, 2013

(51) Int. Cl.

| | | |
|---|---|---|
| *H04N 5/64* | (2006.01) | |
| *H04N 5/225* | (2006.01) | |
| *H04N 5/783* | (2006.01) | |
| *H04N 5/265* | (2006.01) | |
| *G06F 1/12* | (2006.01) | |
| *G11B 27/00* | (2006.01) | |
| *G11B 15/00* | (2006.01) | |
| *G06F 17/30* | (2006.01) | |
| *G06F 17/22* | (2006.01) | |

(Continued)

(52) U.S. Cl.
CPC ............. *G06F 1/12* (2013.01); *G06F 17/211* (2013.01); *G06F 17/2247* (2013.01); *G06F 17/24* (2013.01); *G06F 17/3089* (2013.01); *G06F 17/30905* (2013.01); *G11B 15/00* (2013.01); *G11B 27/00* (2013.01)

(58) Field of Classification Search
CPC .... G06F 17/2247; G06F 17/24; G06F 17/211; G06F 17/3089; G06F 17/30905
USPC .......................................................... 715/234
See application file for complete search history.

(56) References Cited

U.S. PATENT DOCUMENTS 7,254,532 B2   8/2007   Fischer et al.
7,346,516 B2   3/2008   Sall et al.
(Continued)

FOREIGN PATENT DOCUMENTS

EP   846395   10/2002
JP   03620855   2/2005

OTHER PUBLICATIONS

Jing Huang et al., "The IBM RT07 Evaluation Systems for Speaker Diarization on Lecture Meetings", CLEAR 2007 and RT 2007, LNCS 4625, pp. 497-508, 2008.

(Continued)

*Primary Examiner* — Cesar Paula
*Assistant Examiner* — Luu-Phuong Nguyen
(74) *Attorney, Agent, or Firm* — Dan Swirsky (57) ABSTRACT

Synchronizing a data stream with an associated metadata stream by receiving a data stream and a metadata stream having a plurality of metadata events associated with the data stream, identifying within the data stream a plurality of data events, matching each of the data events to one of the metadata events in accordance with a matching criterion, and synchronizing the data stream with the metadata stream by effecting a relative time shift between the metadata stream and the data stream in accordance with a time shift adjustment value that results in the smallest sum of absolute differences between time indices of each matched data event and metadata event.

12 Claims, 6 Drawing Sheets

(51) Int. Cl.
*G06F 17/21* (2006.01)
*G06F 17/24* (2006.01)

(56) References Cited

U.S. PATENT DOCUMENTS

| | | |
|---|---|---|
| 7,661,121 B2* | 2/2010 | Smith et al. ............... 725/135 |
| 7,664,057 B1 | 2/2010 | Wu et al. |
| 7,756,923 B2 | 7/2010 | Caspi et al. |
| 8,509,315 B1* | 8/2013 | Petranovich ............ 375/240.28 |
| 8,707,381 B2* | 4/2014 | Polumbus et al. ........... 725/131 |
| 2006/0149533 A1* | 7/2006 | Bogdanov ............... G10L 25/48 704/205 |
| 2007/0130175 A1* | 6/2007 | Kaneko ................. G11B 27/28 |
| 2007/0186235 A1* | 8/2007 | Jarman et al. ................ 725/28 |
| 2008/0046919 A1* | 2/2008 | Carmi et al. ................... 725/32 |
| 2008/0165245 A1 | 7/2008 | Sarkar et al. |
| 2009/0300520 A1 | 12/2009 | Ashutosh et al. |
| 2010/0054702 A1* | 3/2010 | Kobayashi et al. ........... 386/95 |
| 2011/0081965 A1* | 4/2011 | Klein et al. .................... 463/31 |

OTHER PUBLICATIONS

RadiSys, Media Server Solutions, "Video Conferencing Services", URL: http://www.radisys.com/documents/solutions/RadiSys-Convedia-VideoConferencing.pdf (Last printed on Jul. 17, 2011).
Tandberg, "Tandberg MCU D3.0 Release Notes", D50238, Rev 1.0.
Qibin Sun, Hewlett-Packard, "Multimedia at work: harvesting resources for recording concurrent videoconferences", 2009 Canadian Crown Government. Published by the IEEE Computer Society.

\* cited by examiner

SYNCHRONIZATION OF DATA STREAMS WITH ASSOCIATED METADATA STREAMS USING SMALLEST SUM OF ABSOLUTE DIFFERENCES BETWEEN TIME INDICES OF DATA EVENTS AND METADATA EVENTS

FIELD OF THE INVENTION

The invention relates generally to synchronization of data streams.

BACKGROUND OF THE INVENTION

In a typical computer network-based conferencing system a Multipoint Control Unit (MCU) receives audio/video data streams from multiple participants of a conference, where each data stream that is received from a participant is rebroadcast to the other participants. MCUs are also typically able to separately provide metadata of real-time events that occur during a conference, such as indicating the start and end of a conference, when a participant joins and leave a conference, and which participant is currently speaking. Recording separate data and metadata streams after they are rebroadcast by an MCU faces the difficult challenge of synchronizing the separate data and metadata streams to each other, particularly where the streams themselves do not include explicit synchronization data.

SUMMARY OF THE INVENTION

In one aspect of the invention a method is provided for synchronizing a data stream with an associated metadata stream, the method including receiving a data stream and a metadata stream having a plurality of metadata events associated with the data stream, identifying within the data stream a plurality of data events, matching each of the data events to one of the metadata events in accordance with a matching criterion, and synchronizing the data stream with the metadata stream by effecting a relative time shift between the metadata stream and the data stream in accordance with a time shift adjustment value that results in the smallest sum of absolute differences between time indices of each matched data event and metadata event.

A system and computer program product embodying the invention are also provided.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
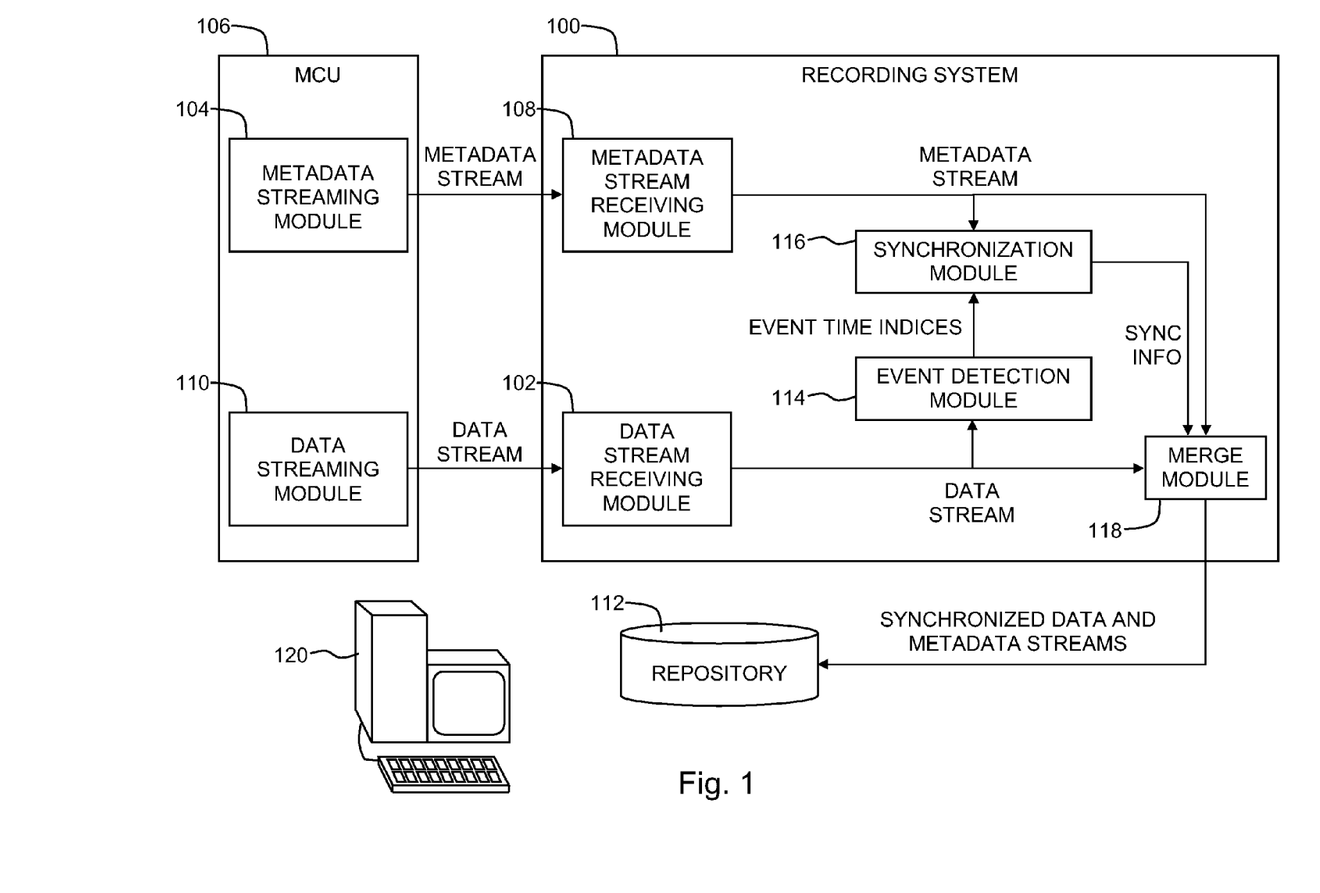
FIG. 1 is a simplified block diagram of a system for synchronization of data streams with associated metadata streams, constructed and operative in accordance with an embodiment of the invention.

Reference is now made to FIG. 1, which is a simplified conceptual illustration of a system for synchronization of data streams with associated metadata streams, constructed and operative in accordance with an embodiment of the invention. In the system of FIG. 1, a recording system 100 typically includes a data stream receiving module 102 that is configured to receive a data stream, such as an audio data stream of conference participant speech conversations provided by a data streaming module 104 of a Multipoint Control Unit (MCU) 106 that is configured to provide computer network-based audio/video conferencing. Recording system 100 also preferably includes a metadata stream receiving module 108 that is configured to receive a metadata stream that is associated with the data stream, such as a stream of conference-related event indicators provided by a metadata streaming module 110 of MCU 106. The data stream and metadata stream are preferably stored by recording system 100, such as in a repository 112, which may be any non-transient, computer-readable data storage medium. Recording system 100 also typically includes an event detection module 114 that is preferably configured to determine the time indices of data events within the data stream, such as speech events, which may be expressed relative to a time index of 0 seconds at the beginning of the data stream. Recording system 100 also preferably includes a synchronization module 116 that determines the relative time shift required to synchronize the data stream with the metadata stream using the time indices of events within the data stream as determined by event detection module 114, and the time indices of the metadata events within the metadata stream, such as where the metadata events include time stamps from which time indices may be derived and normalized relative to a time index of 0 seconds at the beginning of the metadata stream. A merge module 118 preferably applies the relative time shift required to synchronize the data stream with the metadata stream and stores the synchronized streams and/or the time shift information, such as in repository 112.

Any of the elements shown in FIG. 1 are preferably implemented by one or more computers, such as a computer 120, by implementing the elements in computer hardware and/or in computer software embodied in a non-transient, computer-readable medium in accordance with conventional techniques.

Figure 2:
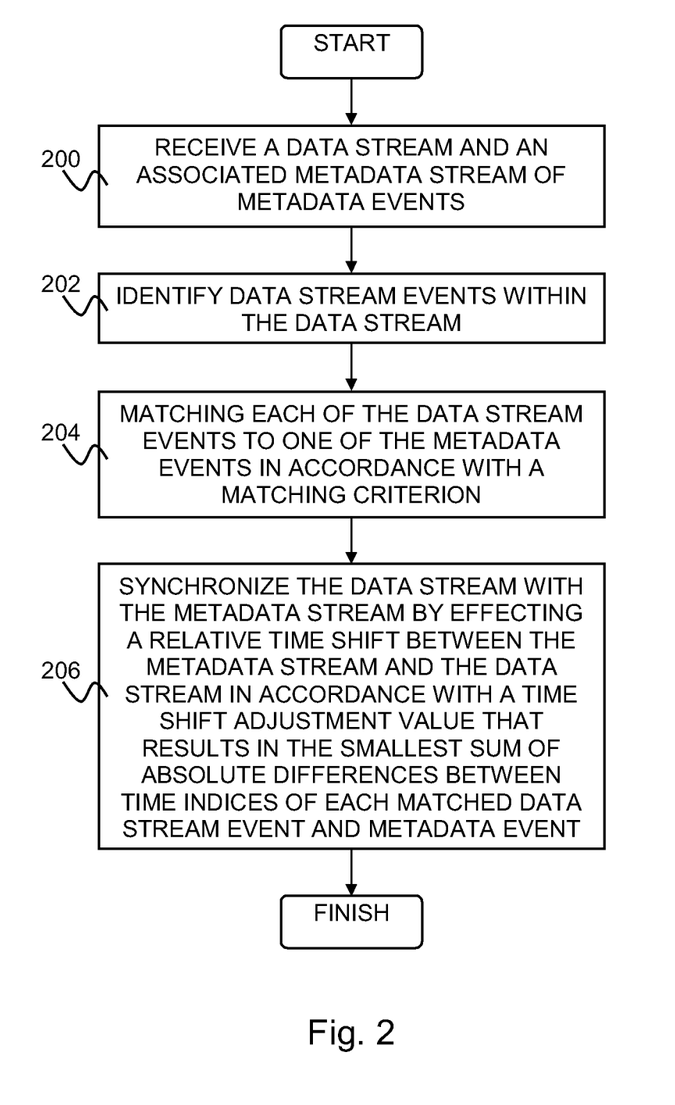
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, a data stream, such as an audio data stream of conference participant speech conversations, and an associated metadata stream of metadata events, such as indicating a change in speaker, are received (step 200). Data stream events, such as speech events that are each preceded by a non-speech segment (e.g., silence) of a predefined minimum duration, are identified within the data stream (step 202), preferably together with their associated time indices. Each of the data stream events are matched to one of the metadata events in accordance with a matching criterion (step 204), such as where a time index of any of the data events is closer in time to a time index of any of the metadata events than to the time index of any other of the metadata events, and preferably where the time indices are within a predefined minimum closeness in time to one another. The data stream is synchronized with the metadata stream by effecting a relative time shift between the metadata stream and the data stream in accordance with a time shift adjustment value that results in the smallest sum of absolute differences between time indices of each matched data stream event and metadata event (step 206).

Figure 3:
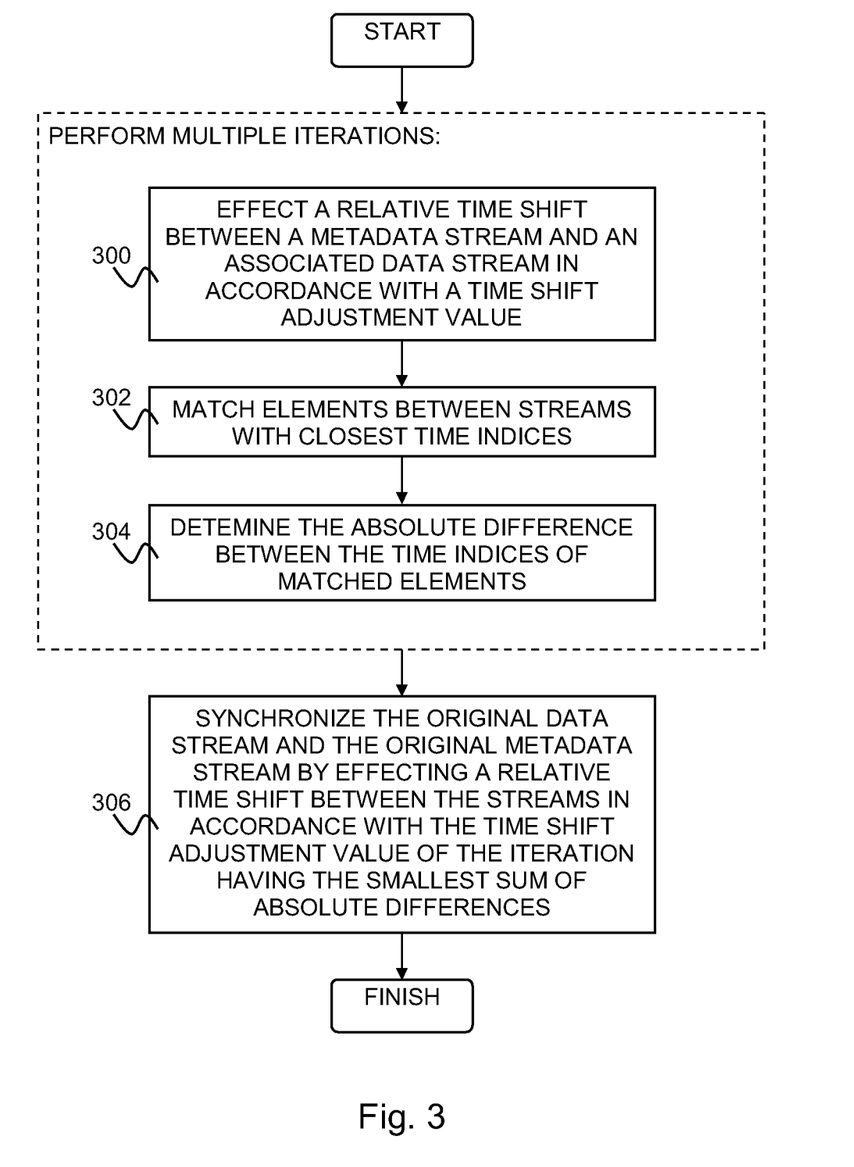
FIG. 3 is a simplified flowchart illustration of an exemplary method of operation of the system of FIG. 1, operative in accordance with another embodiment of the invention.

Reference is now made to FIG. 3, which is a simplified flowchart illustration of an exemplary method of operation of synchronization module 116 of FIG. 1, operative in accordance with an embodiment of the invention. In the method of FIG. 3, multiple iterations of the following steps are performed, where each iteration preferably employs a different time shift adjustment value, such as may be determined by establishing a maximum time shift adjustment value range, such as from −5 seconds to +5 seconds, where the different time shift adjustment values lie within the range, such as in fixed increments of 100 milliseconds, that may be applied sequentially or in a random order. During each iteration a relative time shift between a metadata stream and an associated data stream is effected in accordance with the iteration's time shift adjustment value if the time shift adjustment value is non-zero (step 300). This may be achieved by time-shifting the data stream relative to the metadata stream, or vice versa, where preferably in all of the iterations the same stream is time shifted. Events in one stream that are of a particular type are matched with events in the other stream that are of a related type where their time indices are closest in time to one another, and preferably within a predefined minimum closeness in time to one another (step 302). For example, where a speech segment in the data stream is preceded by a non-speech segment (e.g., silence) of a predefined minimum duration, such as 1.5 seconds, this may indicate that the speech segment is associated with a different speaker than the preceding speech segment. Thus, the speech segment may be matched with an event in the metadata stream that indicates a change in the current speaker where their time indices are closest in time to one another, provided that the time index at the start of the speech segment and the time index of the speaker change event are within a predefined minimum closeness in time to one another, such as within 100 milliseconds. For two or more of such pairs of matched events, and preferably for all such pairs of matched events in the two streams, the absolute difference between the time indices of each event in the pair is determined (step 304). The original data stream is preferably synchronized with the original metadata stream by effecting a relative time shift between the streams (e.g., by time-shifting the metadata stream or the data stream) in accordance with the time shift adjustment value of the iteration having the smallest sum of absolute differences (step 306).

Figure 4A:
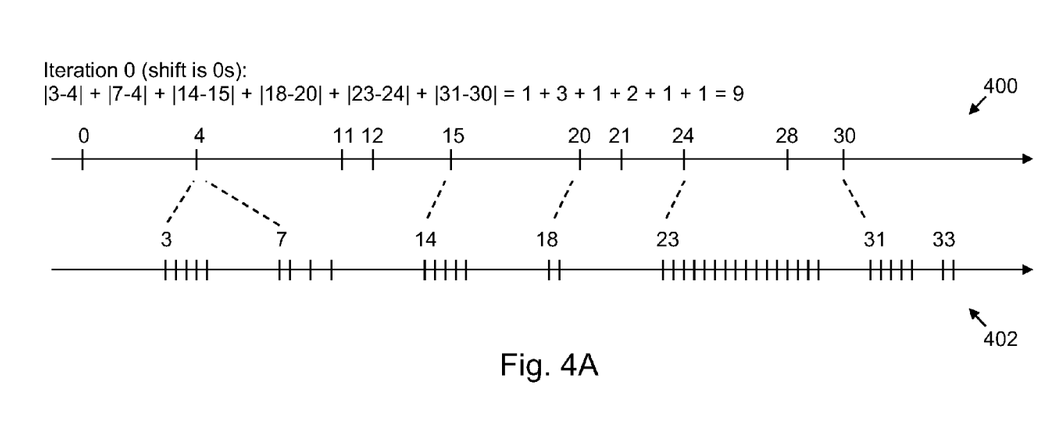
FIGS. 4A-4D are simplified conceptual illustrations of data and metadata streams at different stages of synchronization during application of the invention.
Figure 4B:
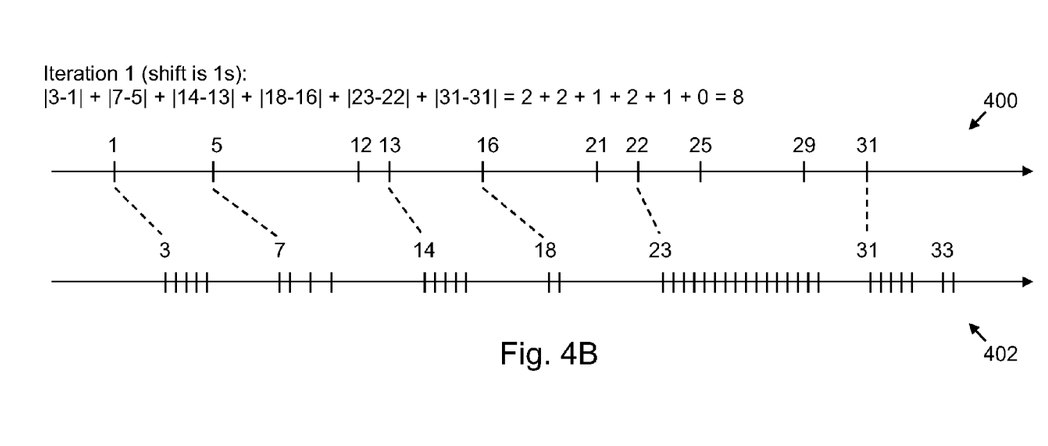
Figure 4C:
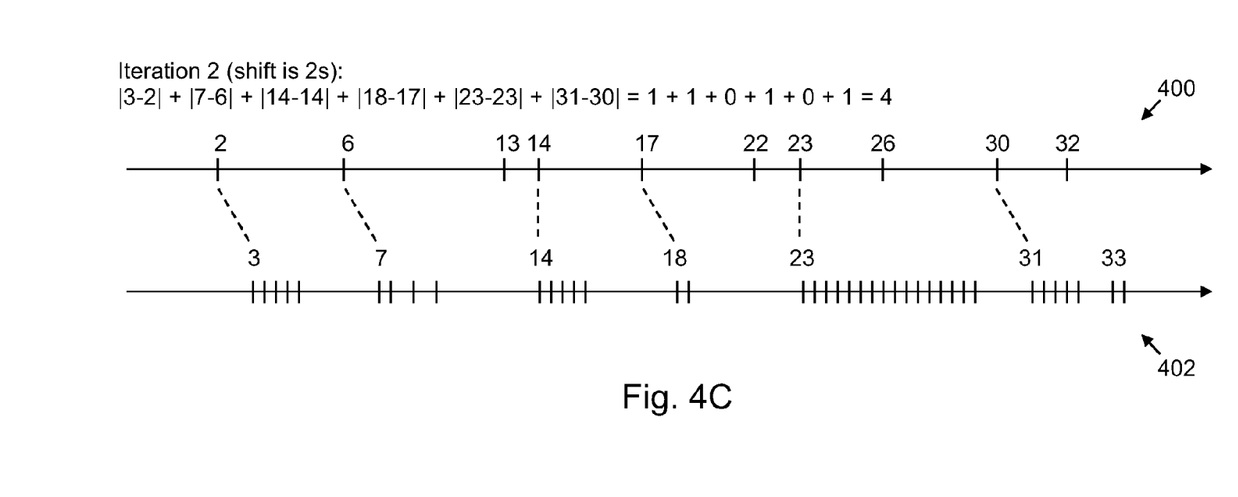
Figure 4D:
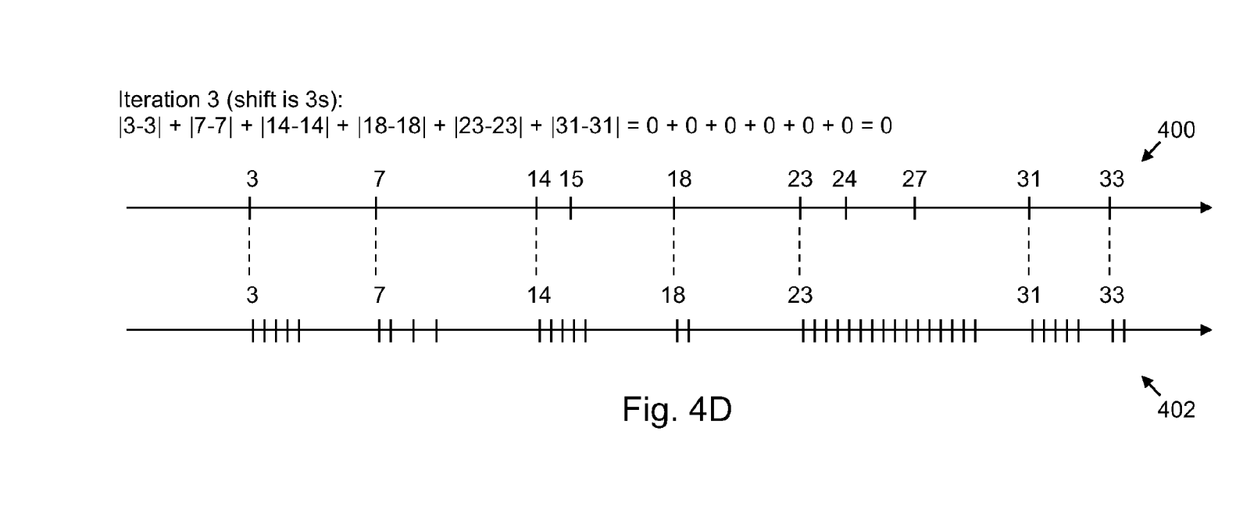

The system of FIG. 1 and methods of FIGS. 2 and 3 may be illustrated in the context of the example shown in FIGS. 4A-4D, in which conceptual representations of a data stream and a metadata stream are shown at different stages of synchronization during application of the invention. In FIGS. 4A-4D a metadata stream 400 and a data stream 402 relating to a multi-party audio conference are shown, where metadata events that represent events indicating a change in the current speaker are shown in metadata stream 300 as solid vertical lines and time indices along a horizontal time line, and where data events indicating speech are similarly represented in data stream 402. In the example shown, speech data events in data stream 402 that are preceded by silence of a predefined minimum duration, such as 1.5 seconds, are matched with metadata events in metadata stream 400 where the time index of a speech data event and the time index of the metadata event are closest in time to one another and are within a predefined minimum closeness in time to one another, such as 3 seconds. Matches data and metadata events are represented as dashed lines. In FIG. 4A, metadata stream 400 and data stream 402 are shown after a first iteration of steps 300-304 of the method of FIG. 3, where no time shift has been applied, and where the sum of the absolute differences between the time indices of the matches is 9. In the second iteration shown in FIG. 4B, metadata stream 400 is time-shifted by +1 second relative to data stream 402, where the metadata event in metadata stream 400 at time index 0 in FIG. 4A is at time index 1 after the time shift is effected, and the time indices of the remaining metadata events are similarly advanced. After the second iteration, the sum of the absolute differences between the time indices of the matches is 8, and after the third and fourth iterations shown in FIGS. 4C and 4D, the sum of the absolute differences between the time indices of the matches is 4 and 0 respectively for time shifts of metadata stream 400 of +2 and +3 seconds respectively. Thus, as a time shift of metadata stream 400 of +3 seconds resulted in the smallest sum of absolute differences between the time indices of the matches between metadata stream 400 and data stream 402 among all iterations, metadata stream 400 and data stream 402 are preferably synchronized by time-shifting metadata stream 400 by +3 seconds. Alternatively, data stream 402 may be time-shifted by −3 seconds, or data stream 402 may be time-shifted by n seconds and metadata stream 400 may be time shifted by m seconds, where n−m=3.

Figure 5:
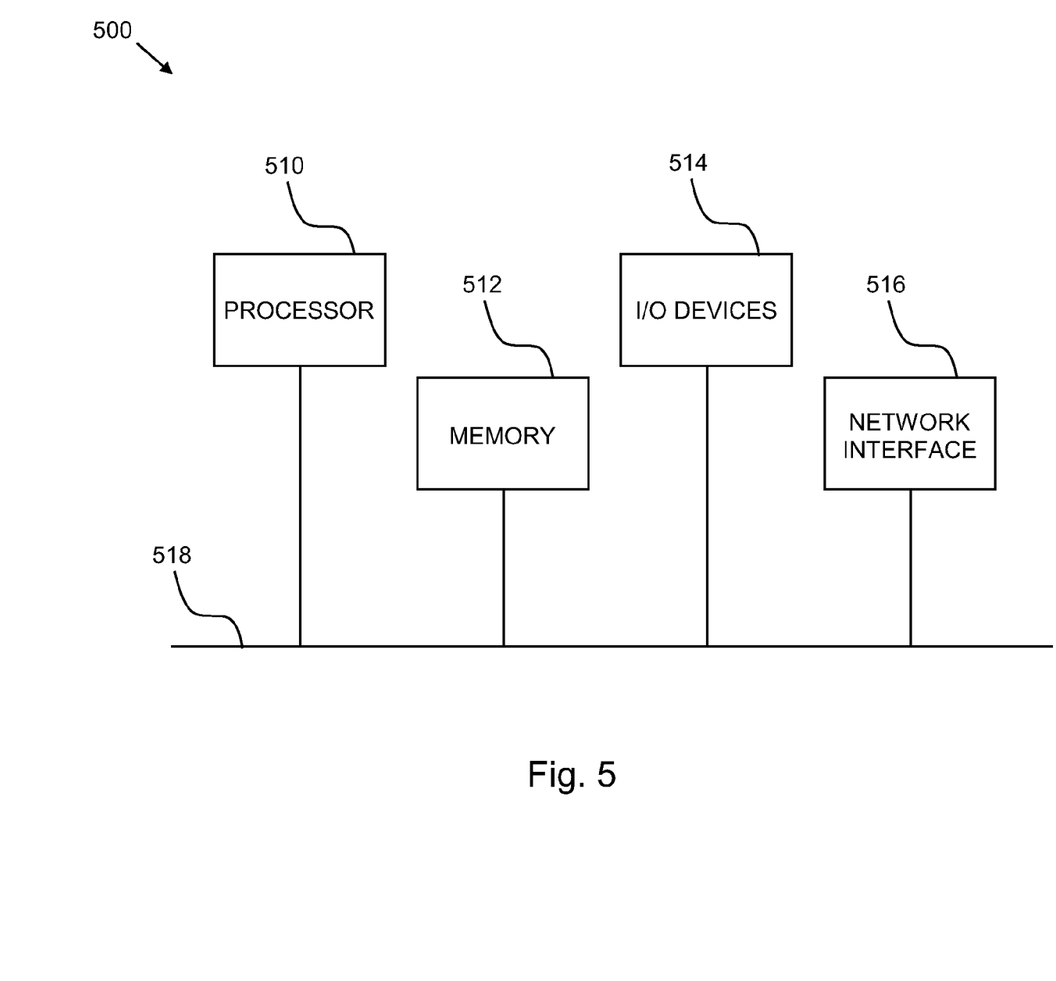
FIG. 5 is a simplified block diagram illustration of an exemplary hardware implementation of a computing system, constructed and operative in accordance with an embodiment of the invention.

Referring now to FIG. 5, block diagram 500 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for synchronizing a data stream with an associated metadata stream, the method comprising:
   receiving a data stream and a metadata stream having a plurality of metadata events associated with the data stream, wherein each of the metadata events is associated with a different metadata event time index;
   identifying within the data stream a plurality of data events, wherein each of the data events is associated with a different data event time index;
   determining a first set of matching time indices for a first relative time shift between the metadata stream and the data stream in accordance with a first time shift adjustment value by matching the data event time indices of a first plurality of the data events to the metadata event time indices of a first plurality of the metadata events where each matched data event time index of the first plurality of data events is closest in time to the metadata event time index with which the matched data event time index is matched;
   calculating a first sum of absolute differences between each matched data event time index in the first set of matching time indices and the metadata event time index which the matched data event time index is matched;
   determining a second set of matching time indices for a second relative time shift between the metadata stream and the data stream in accordance with a second time shift adjustment value, where the second time shift adjustment value is different than the first time shift adjustment value, by matching the data event time indices of a second plurality of the data events to the metadata event time indices of a second plurality of the metadata events where each matched data event time index of the second plurality of data events is closest in time to the metadata event time index with which the matched data event time index is matched;
   calculating a second sum of absolute differences between each matched data event time index in the second set of matching time indices and the metadata event time index which the matched data event time index is matched; and
   synchronizing the data stream with the metadata stream by effecting a relative time shift between the metadata stream and the data stream in accordance with one of the time shift adjustment values that results in the smallest of the sums of absolute differences,
   where said receiving, identifying, determining, calculating, and synchronizing steps are embodied in any of
   a) computer hardware, and
   b) computer software embodied in a non-transitory, computer-readable medium.

2. The method of claim 1 where the identifying step comprises identifying each of the data events as speech.

3. The method of claim 2 where the determining step comprises matching where each of the metadata events indicates a change in speaker.

4. The method of claim 1 where the identifying step comprises identifying each of the data events as speech that begins immediately after a non-speech segment of a predefined minimum length.

5. A system for synchronizing a data stream with an associated metadata stream, the system comprising:
   a data stream receiving module configured to receive a data stream;
   a metadata stream receiving module configured to receive a metadata stream having a plurality of metadata events associated with said data stream, wherein each of the metadata events is associated with a different metadata event time index;
   an event detection module configured to identify within the data stream a plurality of data events, wherein each of the data events is associated with a different data event time index; and
   a synchronization module configured to
      determine a first set of matching time indices for a first relative time shift between the metadata stream and the data stream in accordance with a first time shift adjustment value by matching the data event time indices of a first plurality of the data events to the metadata event time indices of a first plurality of the metadata events where each matched data event time index of the first plurality of data events is closest in time to the metadata event time index with which the matched data event time index is matched,
      calculate a first sum of absolute differences between each matched data event time index in the first set of matching time indices and the metadata event time index which the matched data event time index is matched,
      determine a second set of matching time indices for a second relative time shift between the metadata stream and the data stream in accordance with a second time shift adjustment value, where the second time shift adjustment value is different than the first time shift adjustment value, by matching the data event time indices of a second plurality of the data events to the metadata event time indices of a second plurality of the metadata events where each matched data event time index of the second plurality of data events is closest in time to the metadata event time index with which the matched data event time index is matched,
      calculate a second sum of absolute differences between each matched data event time index in the second set of matching time indices and the metadata event time index which the matched data event time index is matched, and
      synchronize the data stream with the metadata stream by effecting a relative time shift between the metadata stream and the data stream in accordance with one of the time shift adjustment values that results in the smallest of the sums of absolute differences,
   where said modules are embodied in any of
   a) computer hardware, and
   b) computer software embodied in a non-transitory, computer-readable medium.

6. The system of claim 5 where each of the data events represent speech.

7. The system of claim 6 where each of the metadata events indicates a change in speaker.

8. The system of claim 5 where each of the data events represent speech that begins immediately after a non-speech segment of a predefined minimum length.

9. A computer program product for synchronizing a data stream with an associated metadata stream, the computer program product comprising:

a non-transitory computer-readable storage medium; and computer-readable program code embodied in the computer-readable storage medium, where the computer-readable program code is configured to receive a data stream and a metadata stream having a plurality of metadata events associated with the data stream, wherein each of the metadata events is associated with a different metadata event time index, identify within the data stream a plurality of data events, wherein each of the data events is associated with a different data event time index, determine a first set of matching time indices for a first relative time shift between the metadata stream and the data stream in accordance with a first time shift adjustment value by matching the data event time indices of a first plurality of the data events to the metadata event time indices of a first plurality of the metadata events where each matched data event time index of the first plurality of data events is closest in time to the metadata event time index with which the matched data event time index is matched, calculate a first sum of absolute differences between each matched data event time index in the first set of matching time indices and the metadata event time index which the matched data event time index is matched, determine a second set of matching time indices for a second relative time shift between the metadata stream and the data stream in accordance with a second time shift adjustment value, where the second time shift adjustment value is different than the first time shift adjustment value, by matching the data event time indices of a second plurality of the data events to the metadata event time indices of a second plurality of the metadata events where each matched data event time index of the second plurality of data events is closest in time to the metadata event time index with which the matched data event time index is matched, calculate a second sum of absolute differences between each matched data event time index in the second set of matching time indices and the metadata event time index which the matched data event time index is matched, and synchronize the data stream with the metadata stream by effecting a relative time shift between the metadata stream and the data stream in accordance with one of the time shift adjustment values that results in the smallest of the sums of absolute differences.

10. The computer program product of claim 9 where the computer-readable program code is configured to identify each of the data events as speech.

11. The computer program product of claim 10 where the computer-readable program code is configured to match where each of the metadata events indicates a change in speaker.

12. The computer program product of claim 9 where the computer-readable program code is configured to identify each of the data events as speech that begins immediately after a non-speech segment of a predefined minimum length.

* * * * *